(12) United States Patent
Ito et al.

(10) Patent No.: US 12,166,196 B2
(45) Date of Patent: *Dec. 10, 2024

(54) NON-AQUEOUS ELECTROLYTE SECONDARY BATTERY

(71) Applicant: TOYOTA JIDOSHA KABUSHIKI KAISHA, Toyota (JP)

(72) Inventors: Shinichiro Ito, Kosai (JP); Takanobu Yamada, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/226,864

(22) Filed: Jul. 27, 2023

(65) Prior Publication Data

US 2023/0378430 A1 Nov. 23, 2023

Related U.S. Application Data

(63) Continuation of application No. 16/999,518, filed on Aug. 21, 2020, now Pat. No. 11,757,084.

(30) Foreign Application Priority Data

Sep. 11, 2019 (JP) .................. 2019-165623

(51) Int. Cl.
*H01M 4/13* (2010.01)
*H01M 4/62* (2006.01)
(Continued)

(52) U.S. Cl.
CPC ............. *H01M 4/13* (2013.01); *H01M 4/62* (2013.01); *H01M 4/623* (2013.01);
(Continued)

(58) Field of Classification Search
None
See application file for complete search history.

(56) References Cited

U.S. PATENT DOCUMENTS 8,703,343 B2 * 4/2014 Ikeda .................. H01M 10/052
429/251
10,446,824 B2 * 10/2019 Morita .................... H01M 4/13
(Continued)

FOREIGN PATENT DOCUMENTS

CN 102468475 A 5/2012
CN 105190952 A 12/2015
(Continued)

OTHER PUBLICATIONS

U.S. Appl. No. 16/832,037, filed Mar. 27, 2020 in the name of Takanobu Yamada et al.
(Continued)

*Primary Examiner* — Maria Laios
*Assistant Examiner* — Angela J Martin
(74) *Attorney, Agent, or Firm* — Oliff PLC

(57) ABSTRACT

A lithium-ion secondary battery includes an inorganic filler having a mean particle size of 1 μm to 10 μm. A ratio A/B is 14 to 28, where A is a weight ratio of a second binder and the inorganic filler (i.e., second binder/inorganic filler) in an insulating layer, and B is a weight ratio of a first binder and positive electrode active material particles (i.e., first binder/positive electrode active material particles) in a positive electrode active material layer.

4 Claims, 6 Drawing Sheets

(51) Int. Cl.
  *H01M 10/05*   (2010.01)
  *H01M 10/0525*  (2010.01)
  *H01M 10/42*   (2006.01)
  *H01M 4/02*   (2006.01)

(52) U.S. Cl.
  CPC ... *H01M 10/0525* (2013.01); *H01M 10/4235* (2013.01); *H01M 2004/028* (2013.01)

(56) References Cited

U.S. PATENT DOCUMENTS

| | | |
|---|---|---|
| 2012/0058375 A1 | 3/2012 | Tanaka et al. |
| 2012/0115030 A1 | 5/2012 | Tanaka et al. |
| 2016/0043373 A1 | 2/2016 | Arishima et al. |
| 2019/0165368 A1* | 5/2019 | Otohata ............... H01M 4/366 |
| 2019/0245249 A1 | 8/2019 | Otohata |

FOREIGN PATENT DOCUMENTS

| | | |
|---|---|---|
| JP | 2009-043515 A | 2/2009 |
| JP | 2009-134915 A | 6/2009 |
| JP | 2012-114079 A | 6/2012 |
| JP | 2012-234932 A | 11/2012 |
| JP | 2015-213073 A | 11/2015 |
| JP | 2017-143004 A | 8/2017 |
| JP | 2017-157471 A | 9/2017 |
| JP | 2019-145457 A | 8/2019 |
| WO | 2018/021129 A1 | 2/2018 |

OTHER PUBLICATIONS

Aug. 4, 2022 Office Action issued in U.S. Appl. No. 16/999,518.
May 19, 2023 Notice of Allowance Issued in U.S. Appl. No. 16/999,518.

* cited by examiner

NON-AQUEOUS ELECTROLYTE SECONDARY BATTERY

CROSS REFERENCE TO RELATED APPLICATIONS

The present application is a continuation application of U.S. application Ser. No. 16/999,518 filed Aug. 21, 2020, which claims priority from Japanese Patent Application No. 2019-165623 filed on Sep. 11, 2019. The prior applications are incorporated by reference herein in their entireties.

BACKGROUND

The present disclosure relates to a non-aqueous electrolyte secondary battery.

JP 2017-143004 A discloses a non-aqueous electrolyte secondary battery including an insulating layer, disposed on a positive electrode current collector, the insulating layer including an inorganic filler arranged along an end portion of a positive electrode active material layer. It is disclosed that the insulating layer prevents short circuiting between the positive electrode current collector and an end portion of a negative electrode active material layer that is opposed to the positive electrode current collector. According to JP 2017-143004 A, a positive electrode sheet is prepared in which the positive electrode active material layer is disposed on the positive electrode current collector. Next, an insulating paste containing a binder and insulating material particles is applied onto the positive electrode current collector and an end edge portion of the positive electrode current collector that includes an end edge of the positive electrode active material layer, to form the insulating layer. Because the insulating layer is disposed at the boundary portion in which the end portion of the positive electrode active material layer and the positive electrode active material layer are exposed, short circuiting between the positive electrode sheet and the negative electrode sheet is prevented more effectively, so that safety is improved. JP 2017-157471 A describes an embodiment in which a positive electrode active material layer is overlapped so as to cover a portion of an insulating layer. This publication describes that the positive electrode active material layer is applied after applying an insulating layer onto a predetermined position of a positive electrode current collector foil.

SUMMARY

In cases where coating with the positive electrode active material layer and coating with the insulating layer are carried out separately, separate facilities are needed for coating with and drying respective pastes for the positive electrode active material layer and the insulating layer, which inevitably increases the manufacturing cost. The present inventors have conducted investigations on what is called simultaneous coating, a technique of coating with and drying a positive electrode paste containing positive electrode active material particles and an insulating paste containing an insulating material at the same time. This technique allows the steps of coating and drying to be carried out simultaneously for the positive electrode active material layer and the insulating layer. As a result, it is possible to reduce the facility cost in comparison with the cases where the steps of coating and drying are carried out separately for the positive electrode active material layer and the insulating layer, and moreover, it is also possible to reduce the manufacturing cost because the drying can also be carried out at the same time.

In the simultaneous coating, the positive electrode paste and the insulating paste are applied onto the positive electrode current collector at the same time. As a consequence, the positive electrode paste and the insulating paste may be intermixed with each other at a boundary portion therebetween. The present inventors have discovered that input-output current characteristics of the secondary battery may be worsened depending on how the positive electrode paste and the insulating paste are intermixed at the boundary portion.

A non-aqueous electrolyte secondary battery disclosed herein includes a battery case, an electrode assembly enclosed in the battery case, and a non-aqueous electrolyte enclosed in the battery case. The electrode assembly includes a positive electrode sheet, a negative electrode sheet, and a separator.

The positive electrode sheet includes a positive electrode current collector, a positive electrode active material layer disposed on a portion of a surface of the positive electrode current collector and containing positive electrode active material particles, and an insulating layer disposed on a surface of the positive electrode current collector along an edge of the positive electrode active material layer. The positive electrode sheet also includes an intermixed portion in which the positive electrode active material particles and the inorganic filler are intermixed with each other, at a boundary between the positive electrode active material layer and the insulating layer.

The negative electrode sheet includes a negative electrode current collector and a negative electrode active material layer disposed on a portion of a surface of the negative electrode current collector.

The positive electrode sheet and the negative electrode sheet are arranged so that the positive electrode active material layer and the negative electrode active material layer are disposed so as to face each other and the separator is interposed between the positive electrode active material layer and the negative electrode active material layer. The positive electrode active material layer includes positive electrode active material particles and a first binder. The insulating layer includes an inorganic filler and a second binder. The inorganic filler has a mean particle size of 1 μm to 10 μm. A ratio A/B is 14 to 28. where A is a weight ratio (second binder/inorganic filler) of the second binder and the inorganic filler in the insulating layer, and B is a weight ratio (first binder/positive electrode active material particles) of the first binder and the positive electrode active material particles in the positive electrode active material layer.

According to such an embodiment, it is possible to adjust an intruding width to an appropriate width and to obtain a non-aqueous electrolyte secondary battery with excellent input-output current characteristics.

The weight ratio A may be from 0.20 to 0.43. The weight ratio B may be from 0.0120 to 0.0220. The second binder may be polyvinylidene fluoride. The inorganic filler may have an aspect ratio of 1.5 to less than 30 on average over the insulating layer. The inorganic filler may be boehmite. In the positive electrode sheet, the intermixed portion may have a width of 0.05 mm to 0.33 mm.

DETAILED DESCRIPTION

Figure 1:
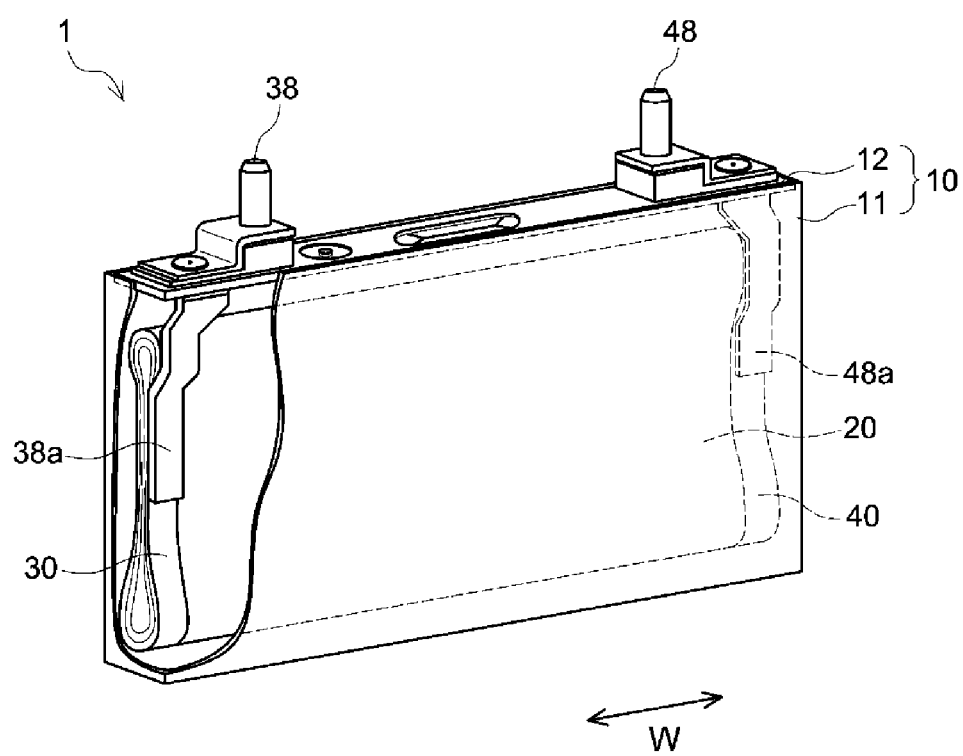
FIG. 1 is a perspective view illustrating the configuration of a lithium-ion secondary battery 1 according to one embodiment of the disclosure.

Hereinbelow, embodiments of a non-aqueous electrolyte secondary battery will be described in detail according to the present disclosure. It should be noted, however, that the embodiments described herein are, of course, not intended to limit the present invention. The present invention is not limited to the embodiments described herein unless specifically stated otherwise. It should be noted that the dimensional relationship (length, width, thickness, and the like) in the drawings mentioned below does not necessarily reflect actual dimensional relationship. Unless specifically stated otherwise, The recitation of numerical ranges in the present description, such as "X to Y", is meant to include any values between the upper limits and the lower limits, inclusive, that is, "greater than or equal to X to less than or equal to Y".

In the present description, the term "non-aqueous electrolyte secondary battery" refers to a battery that uses a non-aqueous electrolyte as the charge carrier and that is capable of charging and discharging repeatedly in association with migration of the charge carrier between positive and negative electrodes. The electrolyte of the non-aqueous electrolyte secondary battery may be any of non-aqueous electrolyte solution, gelled electrolyte, or solid electrolyte, for example. Such a non-aqueous electrolyte secondary battery may also encompass lithium polymer battery and lithium-ion capacitor, in addition to batteries generally referred to as lithium-ion battery and lithium secondary battery. Hereinbelow, the technology disclosed herein will be described with reference to examples in which the non-aqueous electrolyte secondary battery is a lithium-ion secondary battery.

Figure 2:
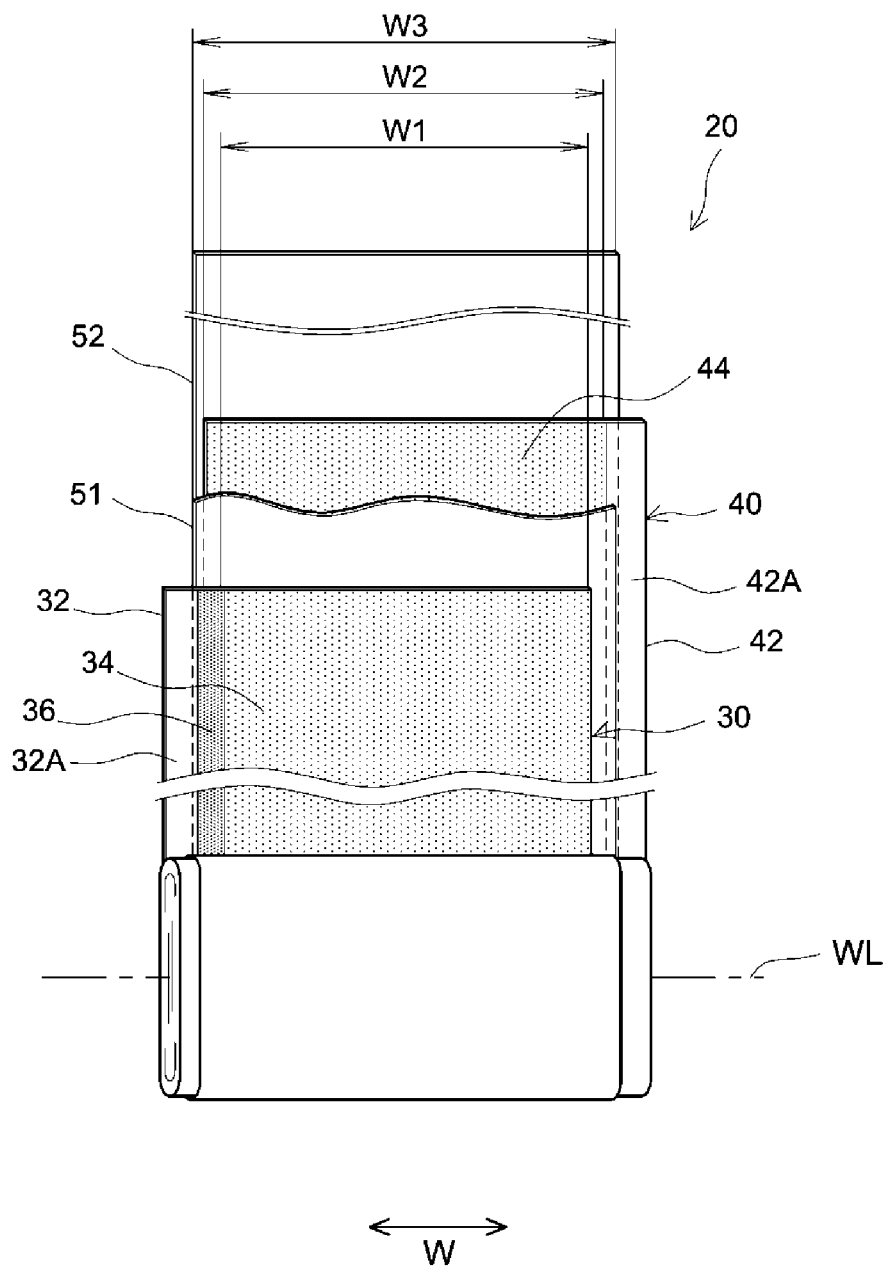
FIG. 2 is a partially expanded view illustrating the configuration of an electrode assembly 20.

FIG. 1 is a perspective view illustrating the configuration of a lithium-ion secondary battery 1 according to one embodiment of the disclosure. In FIG. 1, a portion of a battery case 10 of the lithium-ion secondary battery 1 is cut-out, and an electrode assembly 20 inside the battery case 10 is exposed. FIG. 2 is a partially expanded view illustrating the configuration of the electrode assembly 20.

As illustrated in FIG. 1, the lithium-ion secondary battery 1 includes a battery case 10, and an electrode assembly 20 and a non-aqueous electrolyte solution (not shown) enclosed in the battery case 10. The electrode assembly 20 is covered with an insulating film (not shown) and is enclosed in the battery case 10. As illustrated in FIG. 2, for example, the electrode assembly 20 is what is called a wound electrode assembly, in which a positive electrode sheet 30 and a negative electrode sheet 40 are alternately stacked and wound with a first separator sheet 51 and a second separator sheet 52, which are in a long strip shape, to be interposed therebetween. In another embodiment of the electrode assembly 20, it is possible to employ what is called a stacked electrode assembly, in which positive electrode sheets and negative electrode sheets are stacked with separator sheets interposed therebetween. In FIG. 1, the arrow W indicates widthwise directions, which are along the winding axis of the wound electrode assembly. The arrow W is in agreement with the winding axis WL of the wound electrode assembly 20 shown in FIG. 2.

The positive electrode sheet 30 includes a positive electrode current collector 32, a positive electrode active material layer 34, and an insulating layer 36.

The positive electrode current collector 32 is a member that serves to retain the positive electrode active material layer 34 and to supply and collect electric charge to and from the positive electrode active material layer 34. The positive electrode current collector 32 may be constructed suitably by an electrically conductive member composed of a metal that is electrochemically stable in a positive electrode environment in the battery and also shows good electrical conductivity (for example, aluminum, an aluminum alloy, nickel, titanium, and stainless steel).

In this embodiment, the positive electrode current collector 32 is made of, for example, an aluminum foil, and an uncoated portion 32A is defined with a constant width along one widthwise edge of the positive electrode current collector 32. The positive electrode active material layer 34 is formed on both faces of the positive electrode current collector 32, except for the uncoated portion 32A. Here, the uncoated portion 32A may serve as a positive-electrode current collecting portion of the electrode assembly 20. The insulating layer 36 is formed on the uncoated portion 32A of each of both faces of the positive electrode current collector 32 along the edge of the positive electrode active material layer 34. As illustrated in FIG. 2, the insulating layer 36 is formed along an edge of the positive electrode active material layer 34, and is provided at a region of the uncoated portion 32A that is opposed to the negative electrode active material layer 44.

The positive electrode active material layer 34 is a porous body containing positive electrode active material particles. The positive electrode active material layer 34 may be impregnated with an electrolyte solution. In a lithium-ion secondary battery, the positive electrode active material particles are composed of a material that releases and absorbs lithium ions, serving as the charge carrier, during charge and discharge, respectively, such as a lithium-transition metal composite material. The positive electrode active material layer 34 may additionally contain a conductive agent and trilithium phosphate ($Li_3PO_4$, hereinafter abbreviated as "LPO").

In the positive electrode active material layer 34, typically, positive electrode active material particles, together with a conductive agent, are bonded to each other and also joined to the positive electrode current collector 32 by a binder (binder agent). Herein, the binder contained in the positive electrode active material layer 34 is referred to as a first binder. Also, the binder contained in the insulating layer 36 is referred to as a second binder.

For the positive electrode active material, it is possible to use various types of materials that are conventionally used as the positive electrode active material of lithium-ion secondary batteries without any particular limitation. Suitable examples include: particles of an oxide containing lithium and one or more transition metal elements as its constituent metallic elements (i.e., lithium-transition metal oxide), such as lithium nickel oxide (e.g., $LiNiO_2$), lithium cobalt oxide (e.g., $LiCoO_2$), lithium manganese oxide (e.g., LiMn$_2$O$_4$), and composites thereof (e.g., LiNi$_{0.5}$Mn$_{1.5}$O$_4$ and LiNi$_{1/3}$Co$_{1/3}$Mn$_{1/3}$O$_2$); and particles of a phosphate containing lithium and one or more transition metal elements as its constituent metallic elements, such as lithium manganese phosphate (LiMnPO$_4$) and lithium iron phosphate (LiFePO$_4$).

Such a positive electrode active material layer 34 can be fabricated by, for example, supplying a positive electrode paste onto a surface of the positive electrode current collector 32 and thereafter drying the positive electrode paste to remove the dispersion medium. The positive electrode paste is a mixture in which a positive electrode active material, a conductive agent, and a binder are dispersed in a suitable dispersion medium. Examples of the binder that may be used herein include: acrylic resin, such as (meth)acrylate polymer; halogenated vinyl resin, such as polyvinylidene difluoride (PVDF); and polyalkylene oxide, such as polyethylene oxide (PEO). The dispersion medium may be, for example, N-methyl-2-pyrrolidone. In the configuration that contains a conductive agent, it is possible to use, as the conductive agent, a carbon material such as carbon black (typically, acetylene black or Ketjen Black), activated carbon, graphite, and carbon fiber. These conductive agents may be used alone or in combinations of two or more conductive agents.

The mean particle size (D50) of the positive electrode active material particles is not particularly limited to any size. The mean particle size (D50) of the positive electrode active material particles may be, for example greater than or equal to 1 μm, preferably greater than or equal to 3 μm, for example greater than or equal to 5 μm. The mean particle size (D50) of the positive electrode active material particles may be, for example less than or equal to 15 μm, preferably less than or equal to 10 μm, for example less than or equal to 8 μm.

The proportion of the positive electrode active material contained in the entire positive electrode active material layer 34 may be: about greater than or equal to 75 mass %, typically greater than or equal to 80 mass %, for example greater than or equal to 85 mass %; and typically less than or equal to 99 mass %, for example less than or equal to 95 mass %. With respect to 100 parts by mass of the positive electrode active material, the proportion of the conductive agent in the positive electrode active material layer 34 may be: typically greater than or equal to 1 part by mass, preferably greater than or equal to 3 parts by mass, for example greater than or equal to 5 parts by mass; and typically less than or equal to 15 parts by mass, preferably less than or equal to 12 mass %, for example less than or equal to 10 parts by mass. With respect to 100 parts by mass of the positive electrode active material, the proportion of the first binder in the positive electrode active material layer 34 may be: typically greater than or equal to 0.5 parts by mass, preferably greater than or equal to 1 part by mass, for example greater than or equal to 1.5 parts by mass; and typically less than or equal to 10 parts by mass, preferably less than or equal to 8 parts by mass, for example less than or equal to 5 parts by mass.

The thickness (average thickness, likewise hereinafter) of the positive electrode active material layer 34 after pressing may be: typically greater than or equal to 10 for example greater than or equal to 15 μm; and typically less than or equal to 50 less than or equal to 30 for example less than or equal to 25 Although not particularly limited to these densities, the density of the positive electrode active material layer 34 may be: typically greater than or equal to 1.5 g/cm$^3$, for example greater than or equal to 2 g/cm$^3$; and less than or equal to 3 g/cm$^3$, for example less than or equal to 2.5 g/cm$^3$.

The term "mean particle size" in this description means a cumulative 50% particle diameter (D50) in volumetric particle size distribution obtained by a laser diffraction and scattering method, unless stated otherwise. In addition, a particle diameter at cumulative 10% from the smaller particle size end is referred to as D10, a particle diameter at cumulative 90% is referred to as D90, and the maximum particle diameter is referred to as Dmax.

Figure 3:
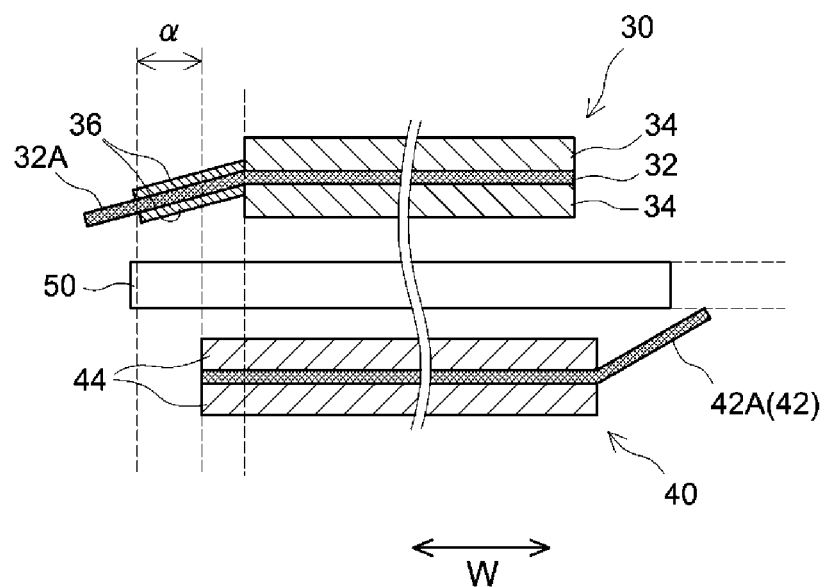
FIG. 3 is a cross-sectional view illustrating an end portion of the electrode assembly 20, schematically enlarged.

The insulating layer 36 includes an inorganic filler and a second binder. The insulating layer 36 is provided with required electrical insulation properties. In such an insulating layer 36, particles of the inorganic filler are bonded to each other or to the positive electrode current collector 32 by the working of the second binder. The insulating layer 36 may be a porous layer that enables charge carriers to pass therethrough. FIG. 3 is a cross-sectional view illustrating an end portion of the electrode assembly 20, schematically enlarged.

As illustrated in FIG. 3, the insulating layer 36 may protrude in a widthwise direction outwardly (leftward in the figure) from the negative electrode active material layer 44 by a dimension a. From the viewpoint that the negative electrode active material layer 44 and the positive electrode current collector 32 should be prevented from facing each other with only the separators 50, 51 and/or 52 interposed therebetween even when the negative electrode active material layer 44 is misaligned, the dimension a may be designed to be such a dimension that the insulating layer 36 can cover the end portion of the negative electrode active material layer 44 sufficiently. In addition, the dimension a may be designed to be such that the insulating layer 36 can sufficiently cover the end portion of the negative electrode active material layer 44 even when the insulating layer 36 undergoes heat shrinkage in a high temperature environment.

Also, from the viewpoint of preventing foil collection defects of the positive electrode current collector 32 (the uncoated portion 32A), the dimension a may be designed to such a dimension that the insulating layer 36 does not protrude in a widthwise direction from the end portions of the separators 51 and 52. The dimension a may be, but is not limited to, greater than or equal to, for example, 113% and less than or equal to 150%, for example, of the dimension of the negative electrode active material layer 44 protruding from the positive electrode active material layer 34. The uncoated portion 32A of the positive electrode current collector 32 protrudes from the end portions of the separators 51 and 52 at a side of the insulating layer 36 that is not adjacent to the positive electrode active material layer 34.

As the inorganic filler that forms such an insulating layer 36, it is possible to use a material provided with heat resistance and electrochemical stability such that it does not soften or melt at a temperature of higher than or equal to 600° C. or higher, typically 700° C. or higher, for example, 900° C. or higher, and is able to maintain electrical insulation between the positive electrode and the negative electrode. Typically, the insulating layer 36 may be composed of an inorganic material, a glass material, a composite material thereof, or the like that is provided with such heat resistance and electrical insulation properties as described above.

Specific examples of such an inorganic filler include: inorganic oxides such as alumina (Al$_2$O$_3$), magnesia (MgO), silica (SiO$_2$), titania (TiO$_2$), barium titanate (BaTiO$_3$); nitrides such as aluminum nitride and silicon nitride; metal hydroxides such as calcium hydroxide, magnesium hydroxide, and aluminum hydroxide; clay minerals such as mica, talc, boehmite, zeolite, apatite, and kaoline; and glass materials. Among these examples, it is preferable to use boehmite ($Al_2O_3 \cdot H_2O$), which is stable in quality and moreover inexpensive and easily available, as the inorganic filler. Moreover, boehmite is a material that is softer than alumina and the like, so it is able to alleviate abrasion of the die for coating and the cutting blade for cutting the positive electrode sheet. Furthermore, when a filler having a flat shape with a high aspect ratio is used as the inorganic filler, the inorganic filler is more likely to form a stack of layers in the insulating layer. As a result, it is possible to improve the mechanical strength of the insulating layer.

In addition, according to a study by the present inventors, an end portion of the negative electrode sheet that faces the insulating layer 36 may have burrs or metallic contaminants adhered thereto because the end portion is cut off in a manufacturing step of the negative electrode sheet. The insulating layer 36 is a layer that serves to prevent the positive electrode current collector from making contact with the end portion of the negative electrode sheet or the metallic contaminants. For this reason, it is desirable that the insulating layer 36 cannot be pierced through easily even when burrs are formed or metallic contaminants are present at the end portion of the negative electrode sheet.

Various types of the second binders that can be used for the positive electrode active material layer 34, for example, may be used for the second binder to be contained in the insulating layer 36. Among them, acrylic resin and halogenated vinyl resin, such as polyvinylidene fluoride (PVDF) may be preferable as the second binder, from the viewpoint that the insulating layer 36 should be formed suitably with an appropriate thickness while imparting suitable flexibility to the insulating layer 36 when current collection is performed by a plurality of positive electrode current collectors 32 that are bundled together.

The proportion of the second binder contained in the insulating layer 36 may be, for example, typically greater than or equal to 10 mass %, preferably greater than or equal to 15 mass %, or may possibly be greater than or equal to 18 mass % or greater than or equal to mass %. The second binder contained in the insulating layer 36 may be, for example, typically less than or equal to 40 mass %, possibly less than or equal to 35 mass %, or possibly less than or equal to 30 mass %. Additionally, such an insulating layer 36 may have a weight per unit area of greater than or equal to about 0.5 $mg/cm^2$, greater than or equal to about 0.7 $mg/cm^2$, or greater than or equal to about 1 $mg/cm^2$, for example, and may have a weight per unit area of less than or equal to about 1.5 $mg/cm^2$, less than or equal to about 1.3 $mg/cm^2$, or less than or equal to about 1.2 $mg/cm^2$, for example.

The negative electrode sheet 40 includes a negative electrode current collector 42 and a negative electrode active material layer 44. The negative electrode current collector 42 is a member that serves to retain the negative electrode active material layer 44 and to supply and collect electric charge to and from the negative electrode active material layer 44. The negative electrode current collector 42 may be suitably constructed by an electrically-conductive member composed of a metal that is electrochemically stable and shows good electrical conductivity in the negative electrode environment in the battery (for example, copper, nickel, titanium, and stainless steel). In this embodiment, the negative electrode current collector 42 is made of, for example, a copper foil, and an uncoated portion 42A is defined with a constant width along one widthwise edge of the negative electrode current collector 42. The negative electrode active material layer 44 is formed on both faces of the negative electrode current collector 42 except for the uncoated portion 42A. Here, the uncoated portion 42A may serve as a negative-electrode current collecting portion of the electrode assembly 20.

The negative electrode active material layer 44 is a porous body containing negative electrode active material particles. The negative electrode active material layer 44 may be impregnated with an electrolyte solution. In a lithium-ion secondary battery, the negative electrode active material particles are composed of a material that absorbs and releases lithium ions, serving as the charge carrier, during charge and discharge, respectively, such as a lithium-transition metal composite material. For the negative electrode active material particles, it is possible to use various types of materials that are conventionally used as the negative electrode active material of lithium-ion secondary batteries without any particular limitation. Suitable examples include: carbon materials represented by artificial graphite, natural graphite, amorphous carbon, and composites thereof (e.g., amorphous carbon coated graphite); materials that form an alloy with lithium, such as silicon (Si); lithium alloys thereof (for example, LiXM, where M is C, Si, Sn, Sb, Al, Mg, Ti, Bi, Ge, Pb, P, or the like, and X is a natural number); and lithium storage compounds such as a silicon compound (such as SiO).

This negative electrode sheet 40 can be fabricated by, for example, supplying a negative electrode paste onto a surface of the negative electrode current collector 42 and thereafter drying the negative electrode paste to remove the dispersion medium. The negative electrode paste is prepared by dispering a negative electrode active material in powder form and a binder [examples include rubbers such as styrene-butadiene copolymer (SBR) and acrylic acid-modified SBR resin (SBR latex), and cellulose-based polymers such as carboxymethylcellulose (CMC)] in an appropriate dispersion medium (such as water and N-methyl-2-pyrrolidone, preferably water).

The mean particle size (D50) of the negative electrode active material particles may be, but not particularly limited to, for example greater than or equal to 0.5 µm, preferably greater than or equal to 1 µm, and more preferably greater than or equal to 5 µm. The mean particle size (D50) of the negative electrode active material particles may be less than or equal to 30 µm, preferably less than or equal to 20 µm, and more preferably less than or equal to 15 µm or less. It is appropriate that the proportion of the negative electrode active material within the entire negative electrode active material layer 44 may be approximately greater than or equal to 50 mass %, preferably from 90 mass % to 99 mass %, for example from 95 mass % to 99 mass %. When a binder is used, the proportion of the binder in the negative electrode active material layer 44 may be, for example, from about 0.1 parts by mass to about 5 parts by mass, normally from about 0.5 parts by mass to about 2 parts by mass, with respect to 100 parts by mass of the negative electrode active material. The thickness of the negative electrode active material layer 44 (average thickness, likewise hereinafter) may be: for example greater than or equal to 10 µm, typically greater than or equal to 20 µm, and may be less than or equal to 80 µm, typically less than or equal to 50 µm. Although not particularly limited to these densities, the density of the negative electrode active material layer 44 may be: for example greater than or equal to 0.8 $g/cm^3$, typically greater than or equal to 1.0 $g/cm^3$; and less than or equal to 1.5 g/cm³, typically less than or equal to 1.4 g/cm³, for example less than or equal to 1.3 g/cm³ or less.

Each of the separators 51 and 52 is a constituent component that electrically insulates the positive electrode sheet 30 and the negative electrode sheet 40 from each other and also provides transfer paths for charge carriers between the positive electrode active material layer 34 and the negative electrode active material layer 44. Each of the separators 51 and 52 is typically disposed between the positive electrode active material layer 34 and the negative electrode active material layer 44. Each of the separators 51 and 52 may also be provided with the function of retaining a non-aqueous electrolyte solution and a shutdown function of closing the transfer paths for charge carriers at a predetermined temperature. Such separators 51 and 52 may be suitably constructed by a microporous resin sheet made of a resin such as polyethylene (PE), polypropylene (PP), polyester, cellulose, or polyamide.

A microporous sheet made of a polyolefin resin such as PE or PP allows the shutdown temperature to be set suitably in a range of 80° C. to 140° C. (typically 110° C. to 140° C., for example, 120° C. to 135° C.). The term "shutdown temperature" refers to a temperature at which the electrochemical reactions of the battery should be stopped when the battery is excessively heated. The shutdown may be accomplished by, for example, melting or softening of the separators 51 and 52. Each of the separators 51 and 52 may have a single layer structure composed of a single material. Each of the separators 51 and 52 may also have a layered structure in which two or more types of microporous resin sheets made of different materials or having different properties (such as average thickness and porosity) are layered (for example, a triple layer structure in which PP layers are stacked on both faces of a PE layer).

The thickness of each of the separators 51 and 52 (average thickness, likewise hereinafter) may be, but not particularly limited to, normally 10 μm or greater, typically 15 μm or greater, for example, 17 μm or greater. Also, the upper limit may be 40 μm or less, typically 30 μm or less, for example, 25 μm or less. When the average thickness of the substrate material is within the just-mentioned range, it is possible to maintain good charge carrier permeability, and moreover, microscopic short circuit (leakage current) is unlikely to occur. As a result, it is possible to achieve both desirable input-output power density and good safety at high level.

As the non-aqueous electrolyte solution, it is possible to use a non-aqueous electrolyte solution in which a supporting salt (such as lithium salt, sodium salt, or magnesium salt; lithium salt for a lithium-ion secondary battery) as an electrolyte is dissolved or dispersed in a non-aqueous solvent, without any particular limitation. Alternatively, it is also possible to use what is called a polymer electrolyte or a solid electrolyte, in which a polymer is added to a liquid-state non-aqueous electrolyte to form a gel state.

For the non-aqueous solvent, it is possible to use various types of organic solvents that are commonly used for the electrolyte solution of lithium-ion secondary batteries, such as carbonates, ethers, esters, nitriles, sulfones, and lactones, without limitation. Specific examples include chain carbonates, such as diethyl carbonate (DEC), dimethyl carbonate (DMC), and ethyl methyl carbonate (EMC), and cyclic carbonates, such as ethylene carbonate (EC) and propylene carbonate (PC). It is also possible that a solvent that is dissolved in an acidic atmosphere of the positive electrode and generates hydrogen ions (such as a cyclic carbonate) may be contained partially. Such a non-aqueous solvent may be fluorinated. The non-aqueous solvent may be used either alone, or in combination of two or more solvents as a mixed solvent.

As the supporting salt, it is possible to select and employ various types of supporting salts that are commonly used for lithlithium-ion secondary batteries as appropriate. Examples of the supporting salt include lithium salts such as $LiPF_6$, $LiBF_4$, $LiClO_4$, $LiAsF_6$, $Li(CF_3SO_2)_2N$, and $LiCF_3SO_3$. These supporting salts may be used either alone or in combinations of two or more salts. The concentration of the supporting salt in the non-aqueous electrolyte may be adjusted to be within a range of 0.7 mol/L to 1.3 mol/L.

The non-aqueous electrolyte may also contain various types of additive agents as long as the characteristics of the secondary battery are not impaired. The additive agent may be used as a gas generating agent, a surface-film forming agent, or the like, for one or two or more of the purposes including improvement in input-output current characteristics of the battery, improvement in cycle performance, improvement in initial charge-discharge efficiency, and the like. Specific examples of the additive agent include fluorophosphate salts (preferably, difluorophosphate salts, such as lithium difluorophosphate represented as $LiPO_2F_2$) and oxalate complex compounds, such as lithium bis(oxalato) borate (LiBOB). It is appropriate that the concentration of such an additive agent be set to 0.1 mol/L or lower (typically 0.005 mol/L to 0.1 mol/L).

The lithium-ion secondary battery 1 shown in FIG. 1 uses a flat prismatic battery case as the battery case 10. However, the battery case 10 may be another type of case, such as a non-flat prismatic battery case, a cylindrical battery case, and a coin-shaped battery case. Alternatively, the lithium-ion secondary battery 1 may include a laminate bag in which a battery case sheet made of a metal (typically an aluminum sheet) and a resin sheet are bonded together to form a bag shape. Additionally, the battery case 10 may be formed of, for example, aluminum, iron, alloys thereof, or reinforced plastic.

The lithium-ion secondary battery 1 shown in FIG. 1 includes what is called a wound electrode assembly 20. In the wound electrode assembly 20 shown in FIG. 1, the long positive electrode sheet 30 and the long negative electrode sheet 40 are overlapped with each other and insulated from each other by the two separators 51 and 52. The positive electrode sheet 30, the negative electrode sheet 40, and the separators 51 and 52 are wound together about the winding axis WL. As shown in FIGS. 2 and 3, width W1 of the positive electrode active material layer 34, width W2 of the negative electrode active material layer 44, and width W3 of the separators 51 and 52 satisfy the relationship W1<W2<W3. The positive electrode sheet 30, the negative electrode sheet 40, and the two separators 51 and 52 are overlapped with each other so that the negative electrode active material layer 44 covers the positive electrode active material layer 34 and the separators 51 and 52 cover the negative electrode active material layer 44. The insulating layer 36 of the positive electrode sheet 30 is adjacent to the positive electrode active material layer 34. The insulating layer 36 covers the positive electrode current collector 32 at least in a region where the positive electrode current collector 32 can face an end portion of the negative electrode active material layer 44.

Herein, a wound type electrode assembly is shown as an example of the electrode assembly 20 of the lithium-ion secondary battery 1. However, the electrode assembly 20 is not limited to the wound type electrode assembly, unless specifically stated otherwise. Although not shown in the drawings, the electrode assembly 20 may be, for example, what is called a flat-sheet stacked type electrode assembly, in which a plurality of positive electrode sheets 30 and a plurality of negative electrode sheets 40 are insulated from each other by separators 51 and 52 and stacked together. The electrode assembly 20 may also be a single cell, in which one sheet of each of the positive electrode sheet 30 and the negative electrode sheet 40 is accommodated in a battery case. In such cases as well, the insulating layer 36 of the positive electrode sheet 30 may be adjacent to the positive electrode active material layer 34, and may cover the positive electrode current collector 32 at least in a region where the positive electrode current collector 32 can face an end portion of the negative electrode active material layer 44.

In this embodiment, the battery case 10 includes a case main body 11 and a lid 12, as illustrated in FIG. 1. The case main body 11 is a substantially rectangular-shaped case, one face of which has an opening. The lid 12 is a member that is fitted to the opening of the case main body 11 to close the opening. As with a battery case for conventional lithium-ion secondary batteries, the lid 12 may include a component such as a safety vent for releasing the gas generated inside the battery case and a filling port for filling an electrolyte solution therefrom. The lid 12 is provided with a positive electrode terminal 38 and a negative electrode terminal 48. Each of the positive electrode terminal 38 and the negative electrode terminal 48 is insulated from the battery case 10. The positive electrode terminal 38 and the negative electrode terminal 48 respectively include a positive electrode current collector terminal 38a and a negative electrode current collector terminal 48a, each extending into the battery case 10. The positive electrode current collector terminal 38a and the negative electrode current collector terminal 48a are electrically connected to the positive electrode sheet 30 and the negative electrode sheet 40, respectively. The lithium-ion secondary battery 1 is configured to input and output electric power to and from an external device through the positive electrode terminal 38 and the negative electrode terminal 48.

The lithium-ion secondary battery disclosed herein is usable in various applications, and may provide, for example, greater safety than conventional products in repeated charge and discharge at high rate. The lithium-ion secondary battery disclosed herein can also achieve both such excellent battery performance and reliability (including good safety such as thermal stability during overcharge) at a high level. With such features, the lithium-ion secondary battery disclosed herein is used suitably for applications that require high energy density, and high input-output power density as well as high reliability. Examples of such applications include driving power sources that are incorporated in vehicles such as plug-in hybrid automotive vehicles, hybrid automotive vehicles, and electric automotive vehicles. Such a secondary battery may typically be used in the form of a battery module, in which a plurality of the batteries are connected in series and/or in parallel to each other.

As described above, the lithium-ion secondary battery 1 as the non-aqueous electrolyte secondary battery disclosed herein includes, as illustrated in FIG. 1, the battery case 10, the electrode assembly 20 enclosed in the battery case 10, and a non-aqueous electrolyte (not shown) also enclosed in the battery case 10.

As illustrated in FIG. 2, the electrode assembly 20 includes the positive electrode sheet 30, the negative electrode sheet 40, and separators 51 and 52. The positive electrode sheet 30 includes the positive electrode current collector 32, the positive electrode active material layer 34 disposed on a portion of a surface of the positive electrode current collector 32, and the insulating layer 36 disposed on a surface of the positive electrode current collector 32 along an edge of the positive electrode active material layer 34. The negative electrode sheet 40 includes the negative electrode current collector 42 and the negative electrode active material layer 44 disposed on a portion of a surface of the negative electrode current collector 42. The positive electrode sheet 30 and the negative electrode sheet 40 are disposed so that the positive electrode active material layer 34 and the negative electrode active material layer 44 face each other. Each of the separators 51 and 52 is interposed between the positive electrode active material layer 34 and the negative electrode active material layer 44.

The present inventors investigate simultaneous coating with the positive electrode active material layer 34 and the insulating layer 36 in manufacturing the positive electrode sheet 30. The simultaneous coating is a technique of coating with and drying a positive electrode paste containing positive electrode active material particles and an insulating paste containing an insulating material at the same time. This technique allows coating and drying of the positive electrode active material layer and the insulating layer to be performed simultaneously. As a result, it is possible to reduce the facility cost in comparison with the cases where the positive electrode active material layer 34 and the insulating layer 36 are separately applied and separately dried, and it is also possible to reduce the manufacturing cost because the drying can also be carried out at the same time. On the other hand, in the simultaneous coating, the positive electrode paste and the insulating paste are applied onto the positive electrode current collector at the same time. As a consequence, an intermixed portion forms, in which the positive electrode paste and the insulating paste are intermixed with each other.

When the positive electrode active material layer 34 and the insulating layer 36 are applied and dried separately, almost no intermixed portion 37 in which the positive electrode paste and the insulating paste are intermixed with each other is formed on the positive electrode current collector 32, except for the cases where such an intermixed portion is formed unintentionally because of, for example, some problems in the manufacture.

Figure 4:
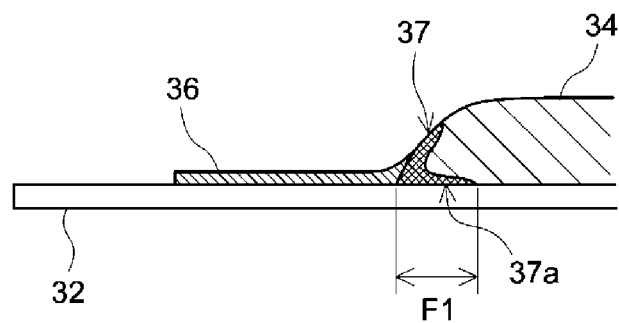
FIG. 4 is a schematic cross-sectional view illustrating a cross section of a positive electrode sheet 30 fabricated by simultaneous coating.

FIG. 4 is a schematic cross-sectional view illustrating a cross section of a positive electrode sheet 30 fabricated by simultaneous coating.

When observing a cross section of the positive electrode sheet 30 fabricated by the simultaneous coating, it is found that, as illustrated in FIG. 4, an intermixed portion 37 of the positive electrode paste and the insulating paste is formed at an edge of the positive electrode active material layer 34 at which the insulating layer 36 is formed. When observed in more detail, it is found that the intermixed portion 37 of the positive electrode paste and the insulating paste intrudes between the positive electrode active material layer 34 and the positive electrode current collector 32.

Of the region in which the positive electrode active material layer 34 and the insulating layer 36 are formed on the positive electrode current collector 32, the portion in which the intermixed portion 37 of the positive electrode paste and the insulating paste intrudes between the positive electrode active material layer 34 and the positive electrode current collector 32 as described above is referred to as an intruding portion 37a. The intermixed portion 37 may be defined as a portion in which the positive electrode active material particles, which are contained in the positive electrode active material layer 34, and the inorganic filler, which is contained in the insulating layer 36, are intermixed with each other. That is, the positive electrode sheet 30 that has been fabricated by simultaneous coating includes an intermixed portion 37 in which the positive electrode active material particles and the inorganic filler are intermixed with each other, at a boundary between the positive electrode active material layer 34 and the insulating layer 36. In other words, the intermixed portion 37 may be defined as a portion in which a region where the positive electrode active material particles contained in the positive electrode active material layer 34 is present and a region where the inorganic filler contained in the insulating layer 36 is present are overlapped with each other. The width of the portion on the positive electrode current collector 32 where the intermixed portion 37 of the positive electrode paste and the insulating paste is formed is referred to as the "intruding width F1".

It should be noted that the intruding width F1 may be assessed by the distance from the boundary between the intermixed portion 37 and the positive electrode active material layer 34 to the opposite end of the intermixed portion 37 that is opposite the just-mentioned boundary, on the positive electrode current collector 32. For example, in the case of wound electrode assembly, the intruding width F1 is assessed with respect to a widthwise direction along the winding axis. In addition, for the long positive electrode sheet 30, the intruding width F1 may be measured at a plurality of arbitrary points along a lengthwise direction, and the intruding width F1 may be assessed by the average value of the plurality of measured values.

As described previously, the positive electrode active material layer 34 includes the positive electrode active material particles and the first binder. The insulating layer 36 includes the inorganic filler and the second binder.

In the lithium-ion secondary battery 1 disclosed herein, the inorganic filler has a mean particle size of 1 µm to 10 µm. Then, the weight ratio of the second binder and the inorganic filler (i.e., second binder/inorganic filler) in the insulating layer 36 is defined as A, and the weight ratio of the first binder and the positive electrode active material particles (i.e., first binder/positive electrode active material particles) in the positive electrode active material layer 34 is defined as B. The present inventors have discovered that, when the ratio A/B is in the range of 14 to 28, it is possible to adjust the intruding width F1 to an appropriate width and to obtain a non-aqueous electrolyte secondary battery with excellent input-output current characteristics.

For the weight ratio A, for example, a sample of the insulating layer 36 may be taken to obtain the weight ratio A of the second binder and the inorganic filler (i.e., second binder/inorganic filler). Likewise, for the weight ratio B, a sample of the positive electrode active material layer 34 may be taken to obtain the weight ratio B of the first binder and the positive electrode active material particles (i.e., first binder/positive electrode active material particles).

Here, when coating with the insulating paste and coating with the positive electrode paste are carried out simultaneously, for example, the positive electrode paste is supplied onto a predetermined position of the strip-shaped positive electrode current collector 32 with a predetermined width while the positive electrode current collector 32 is being transferred along a lengthwise direction. The insulating paste is supplied to a position that is slightly away from the positive electrode paste. The amount of the positive electrode paste supplied per unit time is greater than that of the insulating paste. After having been supplied onto the positive electrode current collector 32, the positive electrode paste and the insulating paste spread in widthwise directions, and an edge of the applied positive electrode paste and an edge of the applied insulating paste abut against each other, forming a boundary. An intermixed portion of the insulating paste and the positive electrode paste is formed at the boundary.

Herein, the amount of the positive electrode paste supplied per unit time is greater than that of the insulating paste. At the boundary between the positive electrode paste and the insulating paste, an edge of the insulating paste is pressed by the positive electrode paste, so the insulating paste tends to be moved above or below the positive electrode paste. Then, the insulating paste and the positive electrode paste are passed through a drying oven and dried immediately after coating. As a result, at the boundary portion between the positive electrode active material layer 34 and the insulating layer 36, the insulating layer 36 overlaps above the positive electrode active material layer 34, and the insulating layer 36 intrudes under the positive electrode active material layer 34 (i.e., between the positive electrode active material layer 34 and the positive electrode current collector 32).

In the lithium-ion secondary battery 1 disclosed herein, the ratio A/B is within a range of 14 to 28, and the weight ratio A of the second binder to the inorganic filler in the insulating layer 36 is higher than the weight ratio B of the first binder to the positive electrode active material particles in the positive electrode active material layer 34. In other words, the ratio of the weight of the second binder to the weight of the inorganic filler in the insulating layer 36 is greater than the ratio of the weight of the first binder to the weight of the positive electrode active material in the positive electrode active material layer 34.

This relatively strengthens the effect of binding the insulating paste to the positive electrode current collector 32 and the effect of binding the insulating paste itself. As a result, even when the edge of the insulating paste is pressed by the positive electrode paste, the insulating paste is not easily moved above or below the positive electrode paste. Accordingly, at the boundary between the positive electrode paste and the insulating paste, the insulating layer 36 is less likely to overlap above the positive electrode active material layer 34, and the insulating layer 36 is also less likely to intrude under the positive electrode active material layer 34. Moreover, the intermixed portion 37 in which the insulating paste is intermixed with the positive electrode paste does not become excessively large. As a result, the intruding portion 37a is not made excessively large, and the intruding width F1 is kept sufficiently small. Because the intruding width F1 is kept small so as to be adjusted to an appropriate width, a sufficiently wide contact area is ensured between the positive electrode active material layer 34 and the positive electrode current collector 32, and the electrical resistance between the positive electrode active material layer 34 and the positive electrode current collector 32 is reduced. Thus, a non-aqueous electrolyte secondary battery with excellent input-output current characteristics can be obtained. It should be noted that the foregoing discussion is a hypothetical theory of the present inventors about the reason why the lithium-ion secondary battery 1 disclosed herein demonstrates good input-output current characteristics, which has been derived from observation of the cross section at the boundary between the positive electrode paste and the insulating paste, but the details are not yet fully understood.

[Input Current Performance Evaluation Test]

The present inventors prepared evaluation test batteries for the non-aqueous electrolyte secondary battery in which the ratio A/B was varied appropriately by varying the materials such as the inorganic filler used for the insulating layer 36, to evaluate the input current performance of the test batteries.

<Preparation of Positive Electrode Sheet>

Figure 5:
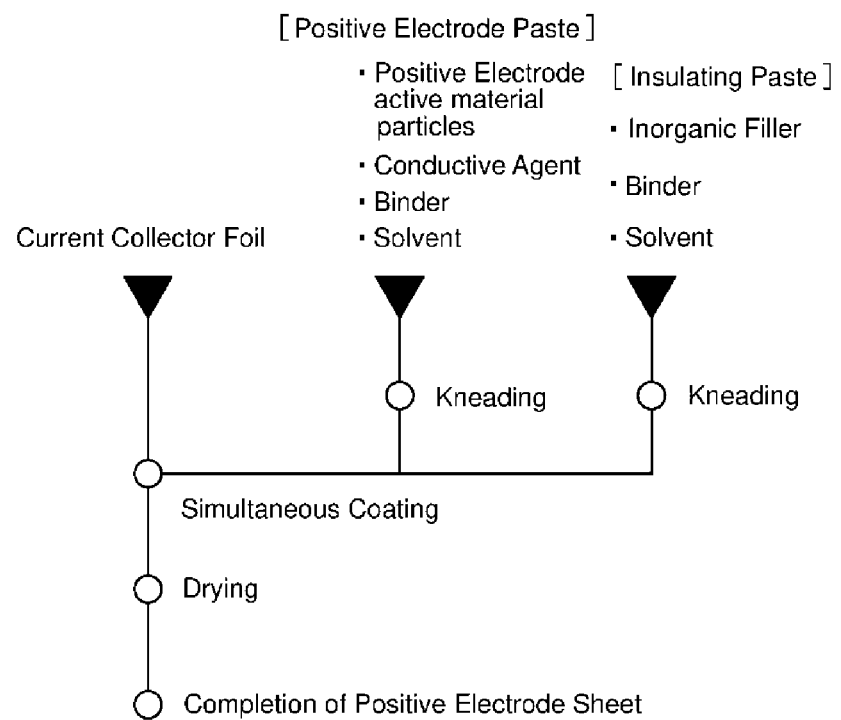
FIG. 5 is a process chart schematically illustrating the process of simultaneous coating.

FIG. 5 is a process chart schematically illustrating the process of simultaneous coating.

As illustrated in FIG. 5, the positive electrode paste and the insulating paste were applied onto the positive electrode current collector by simultaneous coating and dried, and thereafter the positive electrode current collector with the positive electrode paste and the insulating paste were pressed to a predetermined thickness, to thus prepare a positive electrode sheet. As illustrated in FIG. 5, the following materials were used in experimentally manufacturing the samples to prepare the positive electrode paste and the insulating paste.

In the positive electrode paste, as illustrated in FIG. 5, positive electrode active material particles, a conductive agent, and a first binder were contained in a dispersion medium.

$LiNi_{1/3}Co_{1/3}Mn_{1/3}O_2$ was used as the positive electrode active material particles, acetylene black was used as the conductive agent, and polyvinylidene fluoride (PVDF) was used as the first binder.

The positive electrode active material particles used herein had a mean particle sizes of 3 μm to 15 μm. PVDF used here had a molecular weight of about 600,000. The ratio (weight ratio) of positive electrode active material particles, acetylene black, and PVDF was adjusted to the following ratio:Positive electrode active material particles: Acetylene black: PVDF=100:10:1.2 to 2.4. In other words, the amount of PVDF as the first binder was adjusted for the positive electrode paste prepared here. N-methyl-2-pyrrolidone (NMP) was used for the dispersion medium for the paste. The viscosity of the prepared positive electrode paste was controlled to about 5,000 mPa·s. The viscosity of the prepared paste was measured with a cone-plate viscometer at 20° C. and at a shear rate of 21.5 $s^{-1}$. The viscosity may be controlled by, for example, adjusting the amount of the solid content in the paste.

The insulating paste contained an inorganic filler and a second binder in a dispersion medium. Boehmite was used as the inorganic filler, and PVDF was used as the second binder. PVDF used here had a molecular weight of about 1,000,000. The boehmites prepared here were platy boehmite having an aspect ratio of 1.5 to less than 10, dendritic boehmite having an aspect ratio of 10 to less than 30, and flaked boehmite having an aspect ratio of 8 to less than 30. All the bohemite materials used here had a mean particle size within the range of 1 μm to 10 μm. Other than boehmite, alumina was used for the inorganic filler. The alumina used here was fine powder of alumina having a mean particle size of less than 0.8 μm. The alumina used here was fine powder in a substantially spherical shape or cubic shape having an aspect ratio of about 1.1. The dispersion medium of the insulating paste used was NMP. The viscosity of the prepared insulating paste was adjusted to about 2000 mPa·s.

In simultaneous coating, the positive electrode active material particles, the conductive agent, and the binder are mixed and kneaded with a dispersion medium in predetermined proportions, to prepare a positive electrode paste, as illustrated in FIG. 5. Also, the inorganic filler and the binder are mixed and kneaded with a dispersion medium in predetermined proportions, to prepare an insulating paste. Then, the positive electrode paste and the insulating paste are applied simultaneously to a current collector foil that is transferred at a predetermined speed, using a die. The positive electrode paste is applied to a predetermined position of the current collector foil with a predetermined width. The insulating paste is applied to a predetermined position that is slightly away from the positive electrode paste, at a predetermined position with a predetermined width. The applied positive electrode paste and insulating paste spread in widthwise directions and merge at the middle position so that an intermixed portion 37 of the positive electrode paste and the insulating paste (see FIGS. 2 and 4) is formed. The transfer speed of the positive electrode current collector 32 may be set within a range of, for example, 30 m/min to 100 m/min.

Herein, an aluminum foil having a thickness of about 12 μm was used for the current collector foil as the positive electrode current collector. The positive electrode paste and the insulating paste are supplied to a predetermined width along a widthwise direction of the current collector foil at a predetermined weight per unit area. The positive electrode paste and the insulating paste supplied from the die spread smoothly in widthwise directions of the current collector foil. The solid contents or the like of the positive electrode paste and the insulating paste may be adjusted so that they can be dried within about 15 seconds under predetermined drying conditions. The temperature of the drying oven may be set within a range of about 100° C. to about 200° C.

For current collection, the positive electrode sheet is provided with an uncoated portion on which the positive electrode active material layer is not formed along one widthwise edge of the positive electrode current collector.

<Preparation of Negative Electrode Sheet>

The negative electrode sheet was prepared as follows. A negative electrode paste was applied onto a copper foil as the negative electrode current collector and dried, and thereafter negative electrode current collector coated with the negative electrode paste was pressed to a predetermined thickness.

Herein, negative electrode active material particles, a binder agent, and a thickening agent were used for the negative electrode paste. Natural graphite was used for the negative electrode active material. Styrene-butadiene rubber (SBR) was used as the binder agent. Carboxymethylcellulose (CMC) was used as the thickening agent. The resultant negative electrode paste was applied onto both surfaces of a long copper foil having a thickness of about 10 μm as the negative electrode current collector and then dried, to thereby obtain a negative electrode provided with a negative electrode active material layer. For current collection, the negative electrode sheet was provided with an uncoated portion on which the negative electrode active material layer was not formed along one widthwise edge of the negative electrode current collector.

<Construction of Test Battery>

As illustrated in FIG. 2, the thus-prepared positive electrode sheet and negative electrode sheet, which were prepared in the above-described manner, were stacked together with separators to thereby form a multi-layered body, in the following order: separator, negative electrode sheet, separator, and positive electrode sheet. Subsequently, they were wound together to construct a wound electrode assembly. In this process, the positive electrode sheet and the negative electrode sheet were overlapped with each other so that the positive electrode active material layer was covered by the negative electrode active material layer while the separators were interposed between the positive electrode active material layer and the negative electrode active material layer. Also, the positive electrode sheet and the negative electrode sheet were overlapped with each other so that the uncoated portion 32A of the positive electrode sheet and the uncoated portion 42A of the negative electrode sheet (see FIG. 2) were located opposite to each other along a widthwise direction along the winding axis WL. A 20 μm-thick porous sheet of a tri-layer structure PP/PE/PP was used for each of the separators.

The battery case prepared was a flat prismatic battery case made of aluminum alloy. As illustrated in FIG. 1, the wound electrode assembly prepared was attached to the positive electrode terminal and the negative electrode terminal provided on the lid, covered with an insulating film, and enclosed in the case main body. Thereafter, the lid was hermetically closed. Thereafter, a non-aqueous electrolyte solution was filled into the battery case. The non-aqueous electrolyte solution used was a solution in which $LiPF_6$ as a supporting salt was dissolved in a mixed solvent of ethylene carbonate (EC), ethyl methyl carbonate (EMC), and dimethyl carbonate (DMC). The composition ratio of the non-aqueous electrolyte solution was: $LiPF_6$: EC: EMC: DMC=14: 30: 28: 28 in weight ratio. The test batteries prepared experimentally herein were designed to have a cell capacity of about 4 Δh and to show an I-V resistance of about 1.5 mΩ by a constant current discharge at 40 A for 0.2 seconds at 25° C. and 50% SOC.

<Evaluation Test>

Herein, the input current performance of the test battery was evaluated after storage under predetermined conditions. The test batteries were adjusted to 100% SOC and then placed under a temperature environment at 60° C. for 120 days. Thereafter, the test batteries were adjusted to 80% SOC, and then constant-current charged at a predetermined current value in a temperature environment of −20° C. until the voltage reached 4 V. For the test batteries prepared herein, the open circuit voltage (OCV) was approximately 3.85 V at 80% SOC. Herein, after each of the test batteries was adjusted to 80% SOC each time, each of the test batteries was constant-current charged while varying the current value between 60 A to 120 A in a stepwise manner until the voltage reached 4 V. Then, among the current values between between 60 A to 120 A, the current value with which the voltage reached 4 V within 5 seconds of charging was determined. In this case, when the current value that allows the test battery with 80% SOC to reach a voltage of 4 V within 5 seconds of charging is higher, it indicates that the test battery achieves higher input current performance. The results are shown in Table 1 below.

As shown in Table 1, for each of the test batteries, the weight ratio A of the binder (second binder) and the inorganic filler in the insulating layer was determined, and the weight ratio B of the binder (first binder) and the positive electrode active material particles in the positive electrode active material layer was also determined. Then, for each of the test batteries, the ratio A/B was obtained. In addition, the intruding width F1 (see FIG. 4) was evaluated for each positive electrode. The intruding width F1 was evaluated based on the positive electrode sheet that was used when preparing each of the test batteries. The intruding width F1 was obtained at three or more locations in the positive electrode sheet, and the average value of the obtained values was employed as the intruding width F1.

TABLE 1

| | A | B | A/B | Inorganic particle (HRL layer) | Mean particle size (D50) | Aspect ratio | Intruding width (mm) | Input current (A) | HRL layer |
|---|---|---|---|---|---|---|---|---|---|
| Sample 1 | 0.25 | 0.0167 | 14.97 | Platy boehmite | 3 | 6 | 0.20 | 100 | Good |
| Sample 2 | 0.33 | 0.0167 | 19.76 | Platy boehmite | 3 | 6 | 0.10 | 105 | Good |
| Sample 3 | 0.43 | 0.0167 | 25.75 | Platy boehmite | 3 | 6 | 0.05 | 104 | Good |
| Sample 4 | 0.43 | 0.0159 | 27.04 | Platy boehmite | 3 | 6 | 0.05 | 102 | Good |
| Sample 5 | 0.33 | 0.0125 | 26.40 | Flaked boehmite | 5 | 30 | 0.09 | 105 | Good |
| Sample 6 | 0.33 | 0.0220 | 15.00 | Flaked boehmite | 5 | 30 | 0.33 | 95 | Good |
| Sample 7 | 0.20 | 0.0120 | 16.67 | Dendritic boehmite | 6 | 30 | 0.13 | 105 | Good |
| Sample 8 | 0.40 | 0.0210 | 19.05 | Dendritic boehmite | 6 | 30 | 0.18 | 102 | Good |
| Sample 9 | 0.54 | 0.0167 | 32.34 | Platy boehmite | 3 | 6 | 0.00 | 85 | Poor |
| Sample 10 | 0.18 | 0.0167 | 10.78 | Platy boehmite | 3 | 6 | 0.35 | 82 | Good |
| Sample 11 | 0.18 | 0.0171 | 10.53 | Platy boehmite | 3 | 6 | 0.50 | 73 | Good |
| Sample 12 | 0.33 | 0.0240 | 13.75 | Platy boehmite | 3 | 6 | 0.30 | 83 | Good |
| Sample 13 | 0.25 | 0.0200 | 12.50 | Platy boehmite | 3 | 6 | 0.35 | 82 | Good |
| Sample 14 | 0.40 | 0.0130 | 30.77 | Platy boehmite | 3 | 6 | 0.02 | 82 | Poor |
| Sample 15 | 0.33 | 0.0110 | 30.00 | Platy boehmite | 3 | 6 | 0.01 | 85 | Poor |
| Sample 16 | 0.18 | 0.0167 | 10.78 | Alumina | 0.8 | 1.1 | 0.30 | 95 | Good |
| Sample 17 | 0.25 | 0.0167 | 14.97 | Alumina | 0.8 | 1.1 | 0.22 | 100 | Good |
| Sample 18 | 0.43 | 0.0167 | 25.75 | Alumina | 0.8 | 1.1 | 0.20 | 90 | Good |

TABLE 1-continued

|   | A | B | A/B | Inorganic particle (HRL layer) | Mean particle size (D50) | Aspect ratio | Intruding width (mm) | Input current (A) | HRL layer |
|---|---|---|---|---|---|---|---|---|---|
| Sample 19 | 0.33 | 0.0167 | 19.76 | Silica | 5 | 2 | 0.13 | 99 | Good |
| Sample 20 | 0.33 | 0.0167 | 19.76 | Platy boehmite | 3 | 6 | 0.08 | 98 | Good |

All of Samples 1 to 15 and Sample 20 listed here used boehmite for the inorganic filler contained in the insulating layer 36 (see FIG. 4). The boehmite used herein had a mean particle size in the range of 1 μm to 10 μm. Each of Samples 16 to 18 used alumina for the inorganic filler in the insulating layer. The alumina used herein was fine powder having a mean particle size of 0.8 μm. Sample 19 used silica for the inorganic filler in the insulating layer. The silica used herein was fine powder having a mean particle size of 5 μm and an aspect ratio of 2.

Figure 6:
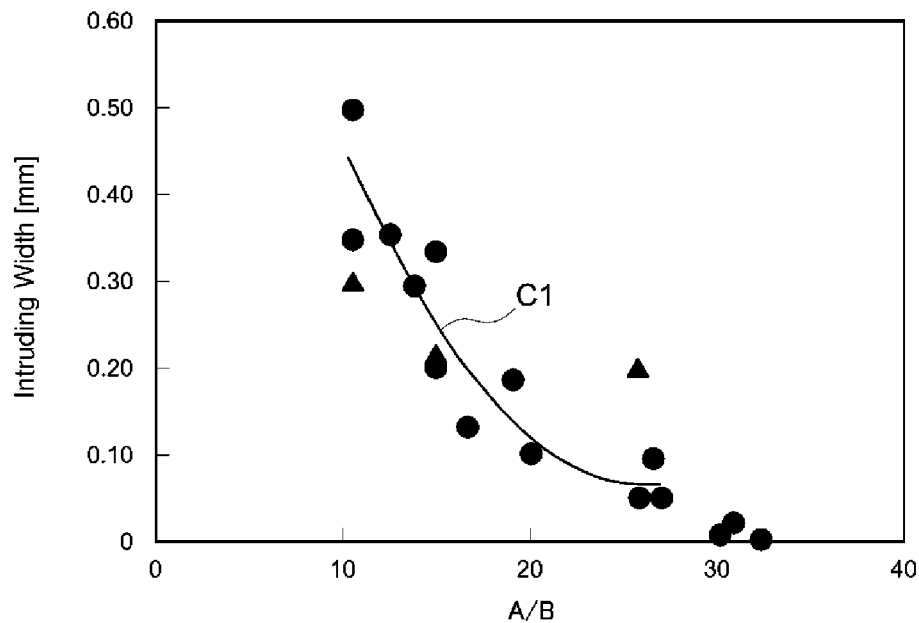
FIG. 6 is a graph illustrating the relationship between ratio A/B and intruding width.
Figure 7:
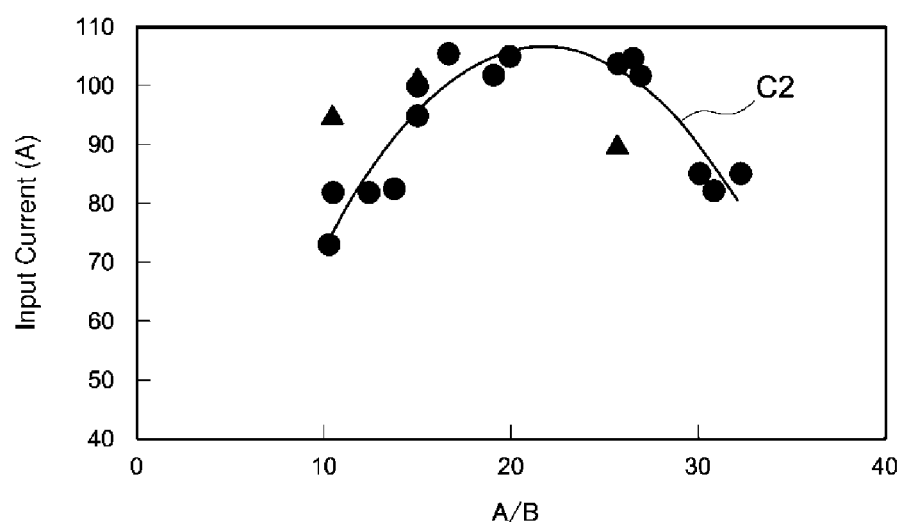
FIG. 7 is a graph illustrating the relationship between ratio A/B and input current characteristics.

FIG. 6 is a graph illustrating the relationship between ratio A/B and intruding width. FIG. 7 is a graph illustrating the relationship between ratio A/B and input current characteristics. In FIGS. 6 and 7, Samples 1 to 15, which use boehmite for the inorganic filler in the insulating layer, are represented by black dots. Samples 16 to 18, which use alumina for the inorganic filler in the insulating layer, are represented by black triangles. Also, FIG. 6 shows a fitted curve C1 that indicates the correlation between A/B values and intruding width for Samples 1 to 15. FIG. 7 shows a fitted curve C2 that indicates the correlation between A/B values and input current characteristics for Samples 1 to 15.

As shown in Table 1, Samples 1 to 8 showed a ratio A/B in the range of 14 to 28. In each of Samples 1 to 8, the intruding width F1 was adjusted to an appropriate width, 0.05 to 0.33. As a result, non-aqueous electrolyte secondary batteries that showed good input-output current characteristics were obtained. Specifically, the intermixed portion 37 of the positive electrode paste and the insulating paste is not formed large. This serves to reduce the amount of the inorganic filler originating from the insulating layer that enters between the positive electrode active material layer 34 and the positive electrode current collector 32. Therefore, it was possible to obtain higher input current characteristics, 95 A or higher, in the evaluation of input current characteristics. Among Samples 1 to 8, Sample 6 had an intruding width of 0.33 mm. Except for Sample 6, Samples 1 to 5 and Sample 7 showed especially higher input current characteristics, 100 A or higher, in the evaluation of input current characteristics. From such a viewpoint, the intruding width may be, for example, from 0.05 mm to 0.20 mm.

On the other hand, Sample 9 had a ratio A/B of 32.34 and an intruding width of 0.00. Sample 14 had a ratio A/B of 30.77 and an intruding width of 0.02. Sample 15 had a ratio A/B of 30.0 and an intruding width of 0.01. According to observation by the present inventors, Samples 9, 14, and 15 did not show a stable width of the insulating layer 36, and their input current characteristics were poorer than those of Samples 1 to 8. The present inventors believe that, when the ratio of A and B (A/B) is greater, about 30, the positive electrode paste and the insulating paste are easily intermixed together, so the width of the insulating layer tends to be instable. On the other hand, Samples 3 to 5 and the like showed a ratio A/B of about 25 to about 28. In such cases, the intruding width was smaller, 0.05 to 0.09, and the input current characteristics were stably higher. From these points, the present inventors believe that, when boehmite is used for the inorganic filler in the insulating paste and the simultaneous coating of the positive electrode paste and the insulating paste is employed as described above, it is desirable that the ratio of A and B (A/B) be less than 30, preferably less than or equal to 28, for example, less than or equal to 27.

Samples 10, 11, 12, and 13 showed a ratio A/B of about 10 to about 14, and less favorable input current characteristics than those of Samples 1 to 8. On the other hand, Samples 1, 2, 6, 7, and 8, for example, showed a ratio A/B of about 14 to about 20, and the input current characteristics were good, 100 A or higher. The present inventors believe that, when boehmite is used for the inorganic filler in the insulating paste and the simultaneous coating of the positive electrode paste and the insulating paste is employed as described above, the ratio A/B may be greater than or equal to 14, for example, greater than or equal to 15.

On the other hand, each of Samples 16 to 18 used alumina for the inorganic filler in the insulating layer. The alumina used herein was fine powder having a mean particle size of 0.8 μm. In this case, as Samples 16 to 18 demonstrate, it is difficult to reduce the intruding width, irrespective of the values of the weight ratio A, the weight ratio B, and the ratio A/B. However, although alumina does not serve to reduce the intruding width, it does not greatly affect the input current characteristics. The present inventors believe that, because alumina used was fine powder with a substantially spherical shape, the influence of the intruding width on the reactions in the positive electrode active material layer was less significant than when boehmite was used.

In contrast, each of Samples 1 to 15 used an inorganic filler having a mean particle size of 1 μm to 10 μm. For Samples 1 to 15, the correlation between the ratio A/B and the intruding width and the correlation between the ratio A/B and the input current characteristics show tendencies that are close to fitted curves C1 and C2, as shown in FIGS. 6 and 7. Therefore, it is believed that there is a certain relationship between the ratio A/B and the intruding width, and between the ratio A/B and the input current characteristics. In contrast, for Samples 16 to 18, which used alumina having a mean particle size of less than 0.8 μm for the inorganic filler in the insulating layer 36, the correlation between the ratio A/B and the intruding width and the correlation between the ratio A/B and the input current characteristics deviate from the fitted curves C1 and C2 shown in FIGS. 6 and 7. As shown in FIGS. 6 and 7, different tendencies are observed between Samples 16 to 18 and Samples 1 to 15 in the relationship between the ratio A/B and the intruding width and in the relationship between the ratio A/B and the input current characteristics.

Figure 8:
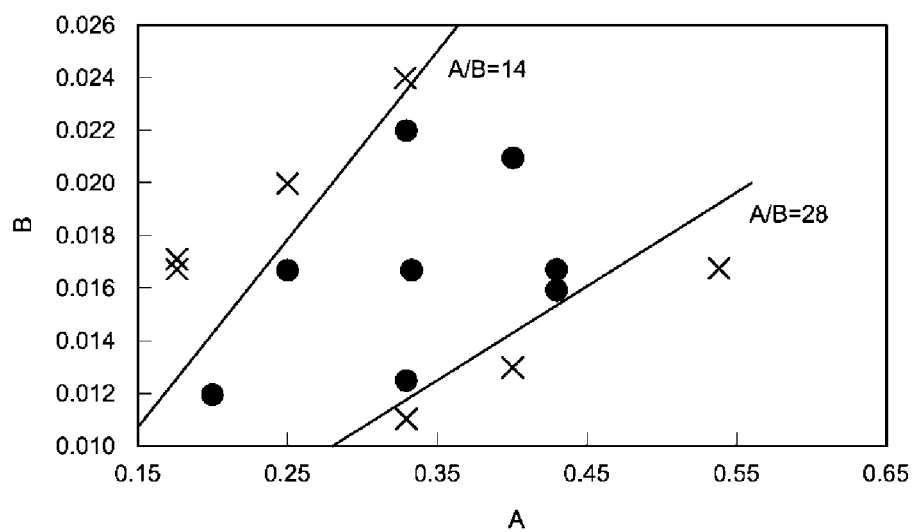
FIG. 8 is a graph illustrating the relationship between A and B for Samples 1 to 15.

FIG. 8 is a graph illustrating the relationship between A and B for Samples 1 to 15. Samples 1 to 15 used boehmite having a mean particle size of 1 μm to 10 μm for the inorganic filler in the insulating layer 36. As shown in FIG. 8, it was discovered that, when boehmite having a mean particle size of 1 μm to 10 μm was used for the inorganic filler, there was a tendency that a battery with good input current characteristics was obtained with the ratio A/B being in the range of 14 to 28.

Thus, when boehmite having a mean particle size of 1 μm to 10 μm is used for the inorganic filler in the insulating layer 36, the ratio A/B may be in the range of 14 to 28. When the ratio A/B is in the range of 14 to 28, a battery with good input current characteristics can be obtained. In other words, the ratio A/B should be adjusted to be within the range of 14 to 28 for the weight ratio A (i.e., second binder/inorganic filler) of the binder (second binder) and the inorganic filler in the insulating layer, and the weight ratio B (i.e., first binder/positive electrode active material particles) of the binder (first binder) and the positive electrode active material particles in the positive electrode active material layer.

Note that such a tendency may also be obtained for other inorganic fillers, not just for boehmite. Sample 19 is an example that used silica having a mean particle size of 5 μm and an aspect ratio of 2. The weight ratios A and B and the ratio A/B were identical to those of Sample 2. In this case, the intruding width was kept small, about 0.13 mm, and the input current characteristics were also good, 99 A. Sample 20 is an example that used platy boehmite having a mean particle size of 3 μm and an aspect ratio of 6. The weight ratios A and B and the ratio A/B were identical to those of Sample 2. Here, the viscosity of the positive electrode paste was adjusted to 10,000 mPa·s, and the viscosity of the inorganic filler was adjusted to 5,000 mPa·s. In this case, the intruding width was kept small, about 0.08 mm, and the input current characteristics were also good, 98 A. Thus, the present inventors discovered that there is a tendency that a secondary battery with good input current characteristics can be obtained by using an inorganic filler having a mean particle size of 1 μm to 10 μm for the insulating layer 36 and adjusting the ratio A/B to within the range of 14 to 28.

From the viewpoint that a secondary battery with good input current characteristics can be obtained, it is also possible that the weight ratio A (second binder/inorganic filler) in the insulating layer may be set to 0.20 to 0.43. Likewise, from the viewpoint that a secondary battery with good input current characteristics can be obtained more easily, it is also possible that the weight ratio B (first binder/positive electrode active material particles) in the positive electrode active material layer may be set to 0.0120 to 0.0220. In addition, the second binder contained in the insulating layer 36 may be PVDF, for example. Also, the molecular weight of PVDF used for the second binder may be from 800,000 to 1,300,000, for example. The second binder contained in the insulating layer 36 may have a higher molecular weight than the first binder contained in the positive electrode active material layer 34. For example, when PVDF is used for each of the second binder and the first binder, the difference between the molecular weights of the first binder and the second binder may be 20% or higher, preferably 30% or higher of the molecular weight of the second binder. In this case, along with adjusting the ratio A/B to be in the range of 14 to 28, it serves to obtain a secondary battery with good input current characteristics more easily.

According to the discovery by the present inventors, the aspect ratio of the inorganic filler contained in the insulating layer 36 may be from greater than or equal to 1.5 to less than 30 on average over the insulating layer 36. In addition, from the viewpoint of preventing abrasion in the manufacturing equipment, the inorganic filler may be boehmite.

When boehmite is used for the inorganic filler contained in the insulating layer 36, the positive electrode sheet 30 may be such that the intermixed portion in which the positive electrode active material particles contained in the positive electrode active material layer 34 and the inorganic filler contained in the insulating layer 36 are intermixed with each other may have a width (intruding width F1) of 0.05 mm to 0.33 mm.

For example, the aspect ratio of the inorganic filler contained in the insulating layer 36 may be from greater than or equal to 1.5 to less than 30 on approximate average over the insulating layer 36. The inorganic filler may employ, for example, particles with a high aspect ratio, such as platy, flaked, or dendritic particles, as shown in Samples 1 to 8. The aspect ratio of the inorganic filler contained in the insulating layer 36 may be determined by, for example, sampling the inorganic filler contained in the insulating layer 36, selecting a predetermined number of samples of the inorganic filler randomly, obtaining the aspect ratios based on photomicrographs (e.g., SEM images obtained by a scanning electron microscope), and obtaining the average value thereof.

Because of the use of an inorganic filler having a high aspect ratio, such as platy, flaked, or dendritic inorganic filler, the insulating layer 36 is unlikely to be pierced through easily even when metal is deposited or metallic contaminants are present at the end portion of the negative electrode sheet. Here, boehmite is shown as an example. Likewise, usable examples of platy, flaked, or dendritic inorganic filler may include boron nitride, silica, and magnesium oxide, other than boehmite. In addition, because boehmite is softer than alumina, boehmite is less likely to cause abrasion in the manufacturing equipment such as a die used in the simultaneous coating. From the viewpoint of a material that is less likely to cause abrasion in the manufacturing equipment, it is possible to use, for example, silica, mica, or hydrated magnesium silicate as the inorganic filler, other than boehmite. Because boehmite is lower in cost than alumina, the use of boehmite serves to reduce the manufacturing cost of the secondary battery. As an inexpensive inorganic filler, it is also possible to use, for example, silica and hydrated magnesium silicate, other than boehmite.

Various embodiments of the non-aqueous electrolyte secondary battery have been described hereinabove according the present disclosure. Unless specifically stated otherwise, the embodiments of the non-aqueous electrolyte secondary battery described herein do not limit the scope of the present invention. It should be noted that various other modifications and alterations may be possible in the embodiments of the non-aqueous electrolyte secondary battery disclosed herein. In addition, the features, structures, or steps described herein may be omitted as appropriate, or may be combined in any suitable combinations, unless specifically stated otherwise.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

The invention claimed is:

1. A non-aqueous electrolyte secondary battery comprising:
    a battery case, an electrode assembly enclosed in the battery case, and a non-aqueous electrolyte enclosed in the battery case, wherein:
    the electrode assembly comprising a positive electrode sheet, a negative electrode sheet, and a separator; and wherein:
        the positive electrode sheet includes:
            a positive electrode current collector;
            a positive electrode active material layer disposed on a portion of a surface of the positive electrode current collector and containing positive electrode active material particles;
            an insulating layer disposed on a same surface of the positive electrode current collector as the positive electrode active material layer, and disposed adjacent to the positive electrode active material layer along a lateral edge of the positive electrode active material layer, the insulating layer containing an inorganic filler; and
            an intermixed portion in which the positive electrode active material particles and the inorganic filler are intermixed with each other, the intermixed portion disposed at a boundary between the positive electrode active material layer and the insulating layer;
    the negative electrode sheet includes a negative electrode current collector and a negative electrode active material layer disposed on a portion of a surface of the negative electrode current collector;
    the positive electrode sheet and the negative electrode sheet are disposed so that the positive electrode active material layer and the negative electrode active material layer face each other and the separator is interposed between the positive electrode active material layer and the negative electrode active material layer;
    the positive electrode active material layer includes a first binder;
    the insulating layer includes a second binder;
    the inorganic filler has a mean particle size of 1 µm to 10 µm;
    a ratio A/B is 14 to 28, wherein A is a second-binder/inorganic-filler weight ratio of the second binder and the inorganic filler in the insulating layer, and B is a first-binder/positive-electrode-active-material-particle weight ratio of the first binder and the positive electrode active material particles in the positive electrode active material layer;
    the weight ratio A is from 0.20 to 0.43;
    the weight ratio B is from 0.0120 to 0.0220; and
    the second binder is polyvinylidene fluoride.

2. The non-aqueous electrolyte secondary battery according to claim 1, wherein the inorganic filler has an aspect ratio of greater than or equal to 1.5 to less than 30 on average over the insulating layer.

3. The non-aqueous electrolyte secondary battery according to claim 1, wherein the inorganic filler is boehmite.

4. The non-aqueous electrolyte secondary battery according to claim 3, wherein the intermixed portion has a width of 0.05 mm to 0.33 mm.

* * * * *